United States Patent [19]

Barnett et al.

[11] Patent Number: 5,723,097
[45] Date of Patent: Mar. 3, 1998

[54] METHOD OF TREATING SPENT POTLINER MATERIAL FROM ALUMINUM REDUCTION CELLS

[75] Inventors: Robert J. Barnett, Goldendale, Wash.; Michael B. Mezner, Sandy, Oreg.

[73] Assignee: Goldendale Aluminum Company, Goldendale, Wash.

[21] Appl. No.: 569,271

[22] Filed: Dec. 8, 1995

[51] Int. Cl.$^6$ .................................. C01F 7/04; C01B 7/19; C01B 7/22

[52] U.S. Cl. .................... 423/111; 423/113; 423/115; 423/131; 423/133; 423/138; 423/155; 423/179; 423/240 R; 423/483; 423/484; 423/551; 501/128; 501/153; 501/154; 501/155; 75/10.48; 75/673

[58] Field of Search .............................. 501/153, 154, 501/155, 128; 423/111, 113, 119, 155, 179, 115, 551, 131, 133, 138, 240 R, 483, 484; 75/10.48, 673

[56] References Cited

U.S. PATENT DOCUMENTS

| | | |
|---|---|---|
| 4,113,831 | 9/1978 | Orth, Jr. et al. . |
| 4,113,832 | 9/1978 | Bell et al. . |
| 4,158,701 | 6/1979 | Andersen et al. . |
| 4,160,808 | 7/1979 | Andersen et al. . |
| 4,394,365 | 7/1983 | Gnyra . |
| 4,735,784 | 4/1988 | Davis et al. . |
| 4,927,459 | 5/1990 | Gardner et al. . |
| 5,024,822 | 6/1991 | Hittner et al. . |
| 5,164,174 | 11/1992 | Banker et al. . |
| 5,222,448 | 6/1993 | Morgenthaler et al. . |
| 5,286,274 | 2/1994 | Lindkvist et al. . |

*Primary Examiner*—Michael Marcheschi
*Attorney, Agent, or Firm*—Donald W. Margolis; John L. Isaac

[57] ABSTRACT

A method of treating spent potliner material from aluminum reduction cells is disclosed. The spent potliner material is introduced into a sulfuric acid digester to produce a gas component including hydrogen fluoride and hydrogen cyanide and a slurry component including carbon, silica, alumina, sodium sulfate, iron, calcium and magnesium. The gas component is recovered and heated an effective amount to eliminate hydrogen cyanide and produce a remaining gas component including $CO_2$, $H_2O$, nitrogen oxides and HF. The remaining gas component is directed through a water scrubber to form hydrofluoric acid, and the hydrofluoric acid is admixed with aluminum hydroxide to create aluminum fluoride. The slurry component is rinsed with water to separate a first solid fraction containing carbon, alumina and silica from a second liquid faction. The pH of the liquid fraction is adjusted to first create and separate aluminum hydroxide and then to separate sodium sulfate. Finally, the solid fraction is admixed with an alumina/silica mix and then subjected to an elevated temperature in an oxygen-rich atmosphere to oxidize the carbon and vitrify the alumina and silica into refractory material.

31 Claims, 2 Drawing Sheets

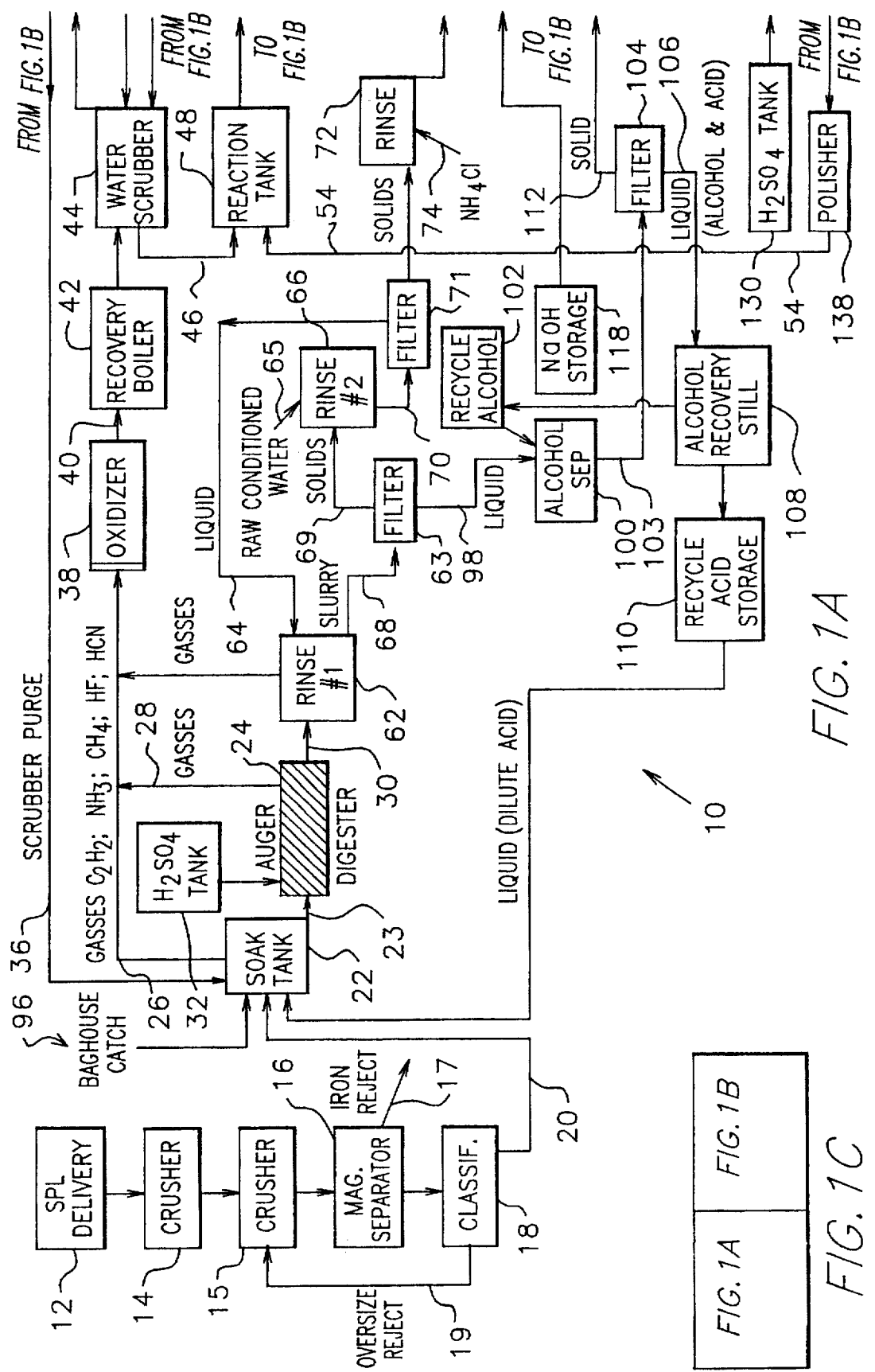

METHOD OF TREATING SPENT POTLINER MATERIAL FROM ALUMINUM REDUCTION CELLS

BACKGROUND OF THE INVENTION

1. Field of the Invention

The present invention relates generally to processes for treating spent potliner material from aluminum reduction cells in a manner in which hazardous wastes are converted and recycled to useful, non-hazardous substances. More, specifically, the present invention relates to a process of recovering, from spent aluminum potliner material, aluminum fluoride, sodium sulfate, and mullite material which can be converted to brick.

2. Description of the Prior Art

The Hall-Heroult process for the production of metallic aluminum dates from the 19th century. Many refinements to the process have been made, but the basic Soderberg or pre-bake configurations using Hall-Heroult cells remain the most common processes for aluminum production throughout the world. In these processes, the bottom and internal walls of a cathode of an aluminum pot are formed with a liner of carbon blocks joined by conductive carbonaceous binder and wrapped with refractory firebricks and insulating bricks, the resulting combination being referred to as "potliner." The insulating bricks and firebricks are composed of material such as silica and alumina (aluminum oxide).

During the production of aluminum, the aluminum reduction pot is filled with a bath of alumina and molten salts. Over the three to seven year life span of an aluminum reduction pot bath salts migrate into the potliner, thereby resulting in the deterioration and eventual failure of the utility of the aluminum cell as a cathode. During its life span a cathodic potliner may absorb its own weight in bath salt materials. The failed potliner material is referred to as spent potliner or "SPL".

When an aluminum reduction cell is taken out of service, the SPL is cooled and fractured to facilitate subsequent handling and disposal. The fractured SPL is a non-homogenous material which contains carbon, silica and/or alumina from the insulating brick and firebricks, aluminum, significant quantities of sodium salts, aluminum salts and oxides, fluoride salts and traces of cyanides. On the average, a large aluminum smelter with a production capacity of 175,000 tons of aluminum per year will produce about 6,000–12,000 tons of SPL per year. The quantity of SPL generated annually in the United States alone has in recent years exceeded approximately 230,000 tons per year.

Because of its cyanide content, its high concentration of leachable fluoride compounds, and the high volumes of SPL produced, SPL presents a significant environmental hazard and a major burden for aluminum producers, who remain ultimately liable for the proper disposition of SPL. The SPL has long been listed as a hazardous waste by the U.S. federal and state environmental authorities. Current regulations require that SPL ultimately be treated to explicitly remove the toxic cyanide, high concentration of leachable fluoride compounds, and other characteristics which cause it to be listed as hazardous before it can be placed in a landfill disposal site.

Many different approaches have been tried over the years to convert SPL to non-hazardous materials. One major technique includes combustion or incineration of the SPL as exemplified in U.S. Pat. Nos. 4,735,784; 4,927,459; 5,024,822; 5,164,174; 5,222,448 and 5,286,274. Unfortunately, most of these processes result with an end product consisting of a glassy slag material which still contain some hazardous, allegedly non-leachable, materials.

Another process includes chemical treatment to convert SPL to non-hazardous materials. In these types of processes, as exemplified by U.S. Pat. No. 4,113,831, the initial SPL constituents are replaced with compounds which are less toxic, but which compounds are still above the hazardous listing levels established by various environmental authorities. Moreover, these residues generally have a final volume which is comparable to the volume of the input.

Another major technique of convening SPL to non-hazardous materials includes pyrohydrolysis of the SPL material. This process generally includes pyrolysis of the material in conjunction with the introduction of water to create an off-gas containing the fluoride materials as illustrated in U.S. Pat. No. 4,113,832. Such pyrohydrolysis techniques may also be in used in conjunction with fluidized bed reactors as disclosed in U.S. Pat. Nos. 4,158,701 and 4,160,808. These processes also still tend to produce large volumes of waste material which must be stored in landfills and which may contain allegedly non-leachable hazardous waste. Thus, there is still a need for a process to chemically treat SPL material from aluminum reduction cells, wherein the end products of such a treatment process are all usable either within the process itself or with other commercial processes as well as secondary end products which are non-toxic to the environment and which do not include large volumes of material for the landfill or for storage.

SUMMARY OF THE INVENTION

It is, accordingly, one object of the present invention to provide a process for treating spent potliner material from aluminum reduction cells.

It is another object of the present invention to provide such a process wherein aluminum fluoride, sodium sulfate, chloride compounds for use in water treatment, and mullite material which can be converted to brick or used as fuel or cement additive, are all recovered from the spent aluminum potliner material in a form which is commercially usable.

Yet another object of the present invention is to provide a process for the treating of spent potliner material from aluminum reduction cells which includes a total recycle of all by-products and elimination of all hazardous wastes.

To achieve the foregoing and other objects and in accordance with the purpose of the present invention, as embodied and broadly described herein, a process of treating spent potliner material from aluminum reduction cells is disclosed. In the process of the present invention spent potliner material is introduced into a sulfuric acid digester. As a result of this step a gas component is produced which includes hydrogen fluoride and hydrogen cyanide, and a slurry component including carbon, silica, alumina, sodium sulfate, aluminum sulfate, iron sulfate, magnesium sulfate and calcium sulfate remains in the digester. The gas component is recovered and heated an effective mount to convert hydrogen cyanide to a remaining gas component including $CO_2$, $H_2O$, nitrogen oxides and HF. The remaining gas component is directed through a water scrubber in which the HF gas is converted to liquid hydrofluoric acid. The hydrofluoric acid is then admixed with aluminum hydroxide to create aluminum fluoride, a commercially useful end product, and water.

The slurry component is rinsed with water to separate a solid fraction containing carbon, alumina and silica from a liquid fraction. The solid fraction is admixed with an alumina/silica mixture and then used as fuel in cement or glass manufacturing. Alternatively, it can then be subjected to an elevated temperature in an oxygen-rich atmosphere. This causes the carbon to oxidize to carbon dioxide which itself has utility as a fuel, and also causes the alumina and silica to vitrify into mullite which has commercial utility in forming brick.

The remaining liquid portion of the slurry is mixed with alcohol at a preferred ratio of about four parts alcohol to about one part liquid. This step removes in excess of 97% of the salts and leaves a solution of sulfuric acid and alcohol. This solution is then subjected to distillation, with the volatile alcohol being recovered for reuse, and the remaining sulfamine acid available to be added back to the system digester to reduce acid consumption. The filtered salts are then dissolved back in $H_2O$ and the pH adjusted to about 12.0–12.5 with NaOH. This step holds aluminum in solution as sodium aluminate and precipitates all other impurities. The solution is filtered to remove the impurities containing calcium, iron, magnesium and silicates primarily. The clear solution is then further pH adjusted to a range of about 7.0–8.0 pH to remove $AL(OH)_3$, and the remaining solution is then admixed with alcohol to precipitate and form sodium sulfate.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawing which is incorporated in and forms a part of the specification illustrates complete preferred embodiments of the present invention according to the best modes presently devised for the practical application of the principles thereof, and in which.

DETAILED DESCRIPTION OF THE PREFERRED EMBODIMENTS

Figure 1B:
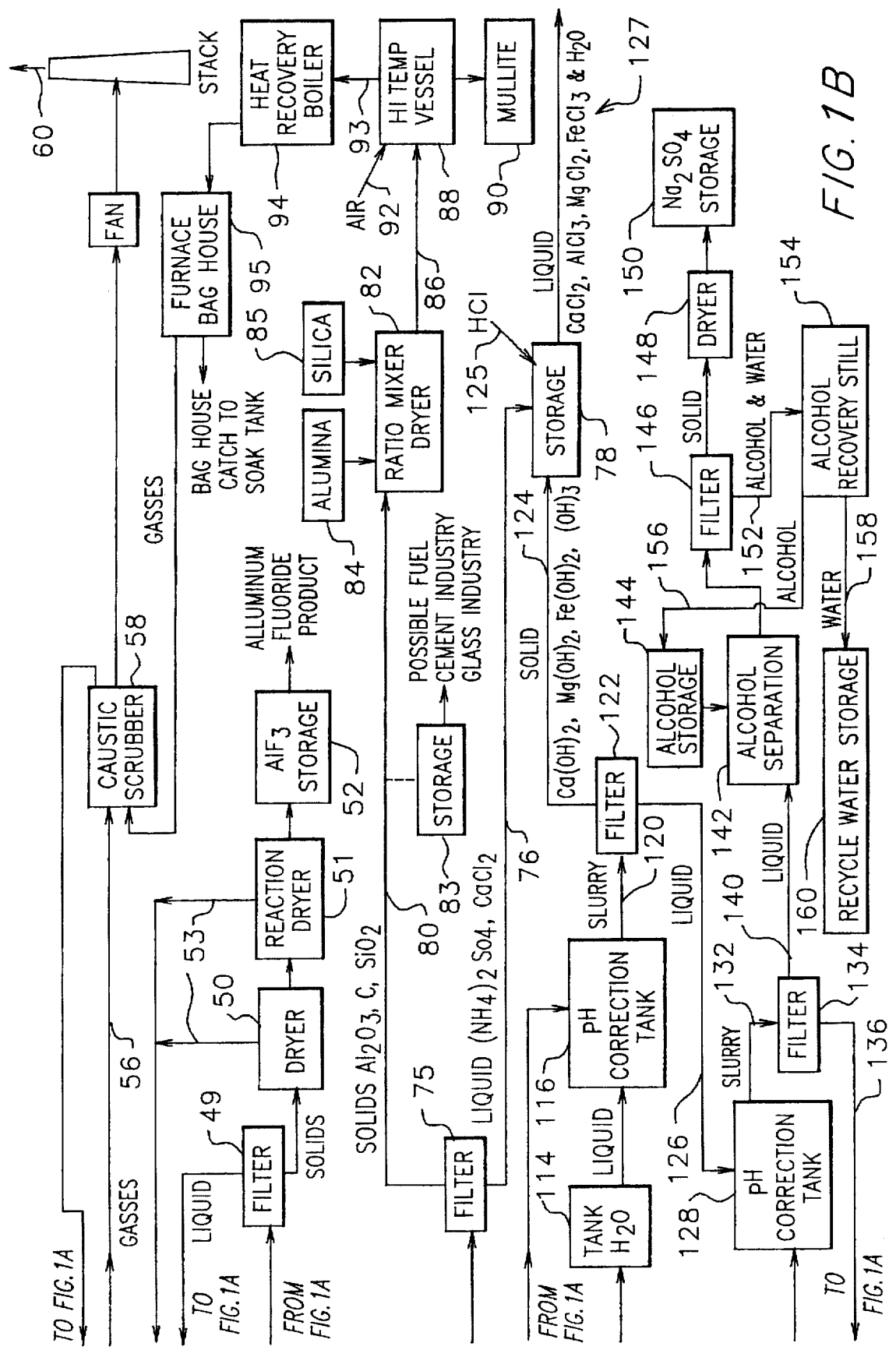
FIG. 1 is a flow diagram illustrating the various process steps and by-products of the present invention.

The process of the present invention for the treatment of spent potliner (SPL) waste materials is shown diagrammatically by FIG. 1, which process is generally identified by the reference numeral 10. The input material 12, consists of SPL as its major ingredient, but may also include any other waste stream with has similar chemical make-up. One preferred operation is described below, although it will be apparent to one skilled in the art that many of the steps are optional.

In preferred operations input material 12 is pulverized by a crusher 14 to a particulate feed size of 16 mesh or less, although larger particles may be used. One preferred form of crusher operation is a two-stage process in which an initial crusher hopper 14 reduces the SPL material to approximately two inch size pieces, with the resulting two inch size pieces then being sent to a second crusher 15 which reduces them to about 16 mesh or less in size. The particulate material from the crushers 14 and 15 is then sent to a magnetic separator 16 which removes iron and any other ferromagnetic particulate metal 17, and in particular iron, from the particulate feed. A 16 mesh classifier 18 returns any particulate material which is greater than 16 mesh to crusher 14 through a return loop 19 in order to reduce the size of that material to 16 mesh or less, since particulate material larger than 16 mesh is not recommended or preferred.

The resulting particulate feed 20 is directed initially into a soak tank 22 for about 24 hours to remove gases, the soak tank preferably containing dilute sulfuric acid. The feed 23 is then directed into a sulfuric acid auger digester 24. Particulate feed 23 is preferably fed into digester 24 by a sealed, variable drive, heated screw. The auger digester 24 is maintained under a negative pressure in order to assist in removing gases which are generated within digester 24. In preferred operations the digester 24 is maintained at approximately 135°–160° C., and the speed of the preferred input and output augers are adjusted to allow for an approximately 30–60 minute retention time of the particulate feed material 23 within the digester 24. In the digester 24, the SPL and other materials react with the sulfuric acid causing any fluoride and cyanide material to be converted to HF and HCN gas, respectively, which is continuously removed from the digester 24 in a gas stream or gas component 28. The remaining solid and liquid material is removed from digester in the form of a slurry component 30.

In preferred operations, concentrated (approximately 93% by weight) sulfuric acid 32 is added to the digester 24 at a rate of approximately 0.8 lbs. $H_2SO_4$ to one pound particulate material. While $H_2SO_4$ is the preferred acid for the digester 24, it should be understood that other acids such as $HClO_4$, HCl, $HNO_3$, or combinations thereof may also be utilized, although this would produce different effluent salts and require modified operations and materials. Air and water are also continuously added to digester 24 through the soak tank 22 at a rate to maintain an approximately 20% moisture content within the digester 24. In preferred operations the water is purge water 36 from caustic scrubber 58, as described in greater detail below. By thus recycling the purge water, any fluoride salts captured from other parts of the process are recovered, and the water thus provided is at a temperature in the range of from about ambient to 120° C., thereby saving heating energy. The use of purge water also eliminates the need to dispose of the waste stream from caustic scrubber 58.

The gas component 26 from the soak tank 22 and the gas component 28 leaving the digester 24 will normally contain hydrogen cyanide (HCN) and hydrogen fluoride (HF). The gas components 26 and 28 are then heated at heater 38. In preferred operations heater 38 is in the form of an art known electric converter/oxidizer which is designed to heat the gas component 28 to approximately 750°–850° C. in the presence of air. At this temperature hydrogen cyanide is oxidized and converted to a residual gas component 40 including $H_2O$, $CO_2$, and $NO_x$, while the HF remains unreacted. The residual gas component 40 is then directed through a waste heat recovery boiler 42 to reduce the temperature of the gases to less than 150°–200° C. The thus cooled residual gas component is then directed into a water scrubber 44. The heat recovered in the boiler 42 is redirected to other stages of the process 10, as desired, to thereby save energy and enhance the efficiency of the process.

In the water scrubber 44, the hydrogen fluoride of the residual gas component 40 is converted to liquid hydrofluoric acid 46 which is then directed to an aluminum hydroxide reaction tank 48 in which it reacts with the $Al(OH)_3$ to form aluminum fluoride and water. Aluminum hydroxide 54 is introduced into the reaction tank 48 from another portion of the process as described below. The reaction tank 48 is heated to about 200° F. for about three hours and is then filtered at 49 and directed to a dryer 50 where the residual solids are heated to less than 10% moisture. These dried solids are then directed to a reaction dryer 51 where the solids are flash heated to about 700° C. creating aluminum fluoride 52. The water 53 is redirected from the dryer 50 and reaction dryer 51 back to the water scrubber 44, thereby eliminating a waste stream at this point of the process. Gases 56 from the water scrubber 44, from which HF has been removed are then passed to a caustic scrubber 58 as a polishing step before release to the atmosphere 60. In preferred form, the caustic scrubber 58 utilizes NaOH to reach a pH in the range of about 7.0–8.0. Sodium hydroxide is preferred because it causes less complications in other liquid streams of the over-all process. As described above, purge water 36 from the caustic scrubber 58 is redirected back to digester 24 through the soak tank 22 for use therein and so as to eliminate yet another waste stream in the overall process and to recapture any residual fluorides which were unreacted with the water scrubber 58.

The aluminum fluoride 52 which is thus produced, is the first primary solid end product of the process 10 of the present invention, and may be utilized commercially in any number of applications. For example, the aluminum fluoride 52 may be used as a bath additive for both ratio corrections in cell linings. This eliminates any environmental impact problems caused by the fluoride materials in the SPL, and, as detailed above, provides a substantial cost benefit and savings.

Now returning to the process of the present invention at digester 24, the slurry component 30 from the digester 24 is directed to a first rinse housing 62 which receives input water 64, and thence through filter 63 to a second rinse housing 66 with additional input water 65. The first rinse 62 removes water soluble salts from the input slurry 30. In the preferred process the slurry 68 from the first rinse housing 62 passes through the filter press 63, and then the solids 69 are introduced to the second stage water rinse housing 66 for polishing. The solid stream or fraction 70 from the second water rinse 66 includes carbon, alumina, silica, and, generally, a relatively high concentration of calcium sulfate salt. Due to this high concentration of calcium sulfate level, the solid stream 70 passes through a filter 71 and into a third rinse 72 which is used in the preferred processes to remove the soluble calcium sulfate salts from the solids. In preferred operations wherein mullite is a desired end product, an ammonium chloride solution 74 of approximately 20% by weight is introduced to the rinse 72 to react with the calcium sulfate to form ammonium sulfate and calcium chloride as indicated by the reaction formula

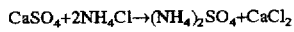

The solution containing these two remaining salts, that is ammonium sulfate and calcium chloride, are filtered at 75 and carried by stream 76 to a storage unit 78 wherein they may later be recovered or reused as a calcium chloride liquid and an ammonium sulfate solid. Regardless of their later use, both of these salts are non-toxic and present no substantial environmental danger.

The solids 80 which remain after the rinses 62, 66 and 72 and are filtered at 75 and are preferably directed to a mixer dryer 82 and include alumina, silica and carbon. In the alternative, the solids 80 may be directed to a storage unit 83 wherein they may be sold and readily used in cement manufacture or in the glass and ceramics industry. At the mixer dryer 82, an alumina 84 and silica 85 mix is added in order to adjust the alumina to silica ratio within the mixer dryer 82 to a ratio of about 70% to 30%, by weight, respectively. This 70:30 alumina:silica mix 86 is then passed into a high temperature vessel 88 in which it is subjected to an elevated temperature in the range of about 1,600° to about 2,000° C. in an oxygen-rich atmosphere. This causes any carbon remaining therein to be oxidized to carbon dioxide, while simultaneously vitrifying the alumina and silica into a fused composition of high purity mullite 90. This high purity mullite 90 is a second major solid end product of the process of the present invention. The mullite may be utilized to make furnace brick for use within aluminum reduction cells or for use for other commercial purposes. In preferred processes, the oxygen-rich atmosphere within the vessel 88 is maintained by introducing oxygen, preferably in the form of air 92, to the vessel 88. Carbon dioxide and heat as well as small amounts of gases, HF and particulates, are removed from the vessel 88 in the form of a heated gas stream 93 and are then directed through a heat recovery boiler 94 to a bag house 95. In the bag house 95, the particulates are removed and redirected as bag house catch 96 to the soak tank 22, while the gases 97 are directed to the caustic scrubber 58 and then back to the soak tank 22. Thus the carbon in the SPL is used for useful purposes within the process 10 of the present invention as a fuel source to lower energy costs of the system, rather than remaining as a useless lands material typical of prior SPL treatment processes or systems.

The liquid fraction 98 from the first and second rinse housings 62 and 66, respectively, having been filtered at 63 is then directed to an alcohol separator 100. In the separator 100, alcohol, for example methanol or ethanol 102 is admixed with the liquid 98 in a volume ratio of approximately 4:1 alcohol to liquid fraction. This step separates about 97% or more of the salts in the liquid fraction 98 which are filtered out of slurry stream 103 at filter 104. The liquid stream 106 from the filter 104 includes the alcohol and excess acid from the digester 24 and is directed through a recovery evaporation still 108 wherein alcohol is separated and returned to the alcohol storage source 102, and the remaining sulfuric acid is stored at 110 and eventually returned to the soak tank 22 for reuse in the digester 24. In this manner, the use of sulfuric acid and sodium hydroxide in the process 10 can be reduced, while alcohol is recovered and reused, thus enhancing the economics of the process 10 as compared to prior art systems.

The salts 112 from the filter 104 are redissolved in a water bath 114 and then pH adjusted in tank 116 preferably using sodium hydroxide 118 to a pH of about 12.0–12.5. This step forms a slurry 120 containing soluble sodium aluminate and insoluble impurities including calcium hydroxide, iron hydroxide and magnesium hydroxide. The insoluble impurities are filtered at 122 and directed via solids stream 124 to the storage tank 78. HCl 125 can be introduced to the tank 78 to produce a mixture 127 of calcium chloride, iron chloride and magnesium chloride, which mixture 127 is a useful product for use in industrial water treatment. The liquid fraction 126 from the filter 122 is directed to a second pH correction tank 128 wherein sulfuric acid 130 is added to lower the pH to about 7.0–8.0. This step forms a slurry 132 containing soluble sodium sulfate and aluminum hydroxide precipitate.

The slurry 132 is then filtered at 134, and the aluminum hydroxide solids 136 are polished at 138 and then redirected as the aluminum hydroxide stream 54 to the reaction tank 48 to form aluminum fluoride as previously discussed. The sodium sulfate containing liquid stream 140 from the filter 134 is directed to a second alcohol separation tank 142 wherein alcohol 144, either methanol or ethanol, is mixed with the liquid stream in a volume ratio of approximately 4:1 alcohol:liquid stream to precipitate sodium sulfate. The precipitated sodium sulfate is filtered at 146 and is then directed to a dryer 148 and then storage 150, wherein the resultant sodium sulfate is approximately 99.0% pure. The liquid portion 152 is directed from the filter 146 to an alcohol recovery still 154 wherein alcohol is separated and directed via stream 156 back to storage unit 144 for reuse in the process, while the water stream 158 is directed to water recycle storage unit 160 for reuse within the process 10, such as at 114.

As the result of the above process 10, spent potliner material is reduced and recycled into four commercially useful ingredients, that is aluminum fluoride, mullite raw brick material which can also be used in cement or glass manufacture, sodium sulfate and water treatment materials such as calcium chloride, magnesium chloride and iron chloride.

EXAMPLE

Sixty tons per day of SPL feed including caked materials and sweepings, is continuously introduced to the crusher 14 and is processed through the steps of the process 10 as described above. Utilizing this process the 60 ton/day SPL input 12 yields approximately thirteen tons per day aluminum fluoride end product, approximately ten tons per day of a refractory material, and approximately fifty tons per day of sodium sulfate, for a total of about seventy-three tons of recycled solid materials, with the balance of the starting materials being converted to harmless gases and salts. In processing this 60 tons per day of SPL input 12, substantially all of the cyanides contained therein are destroyed, and substantially all of the fluorides are converted to aluminum fluoride as a useful end product. Thus, these highly environmentally damaging materials are either eliminated or converted to useful products.

As can be seen from the above, the present invention provides a highly efficient process for not only treating the significantly hazardous spent potliner material from aluminum reduction cells, but also serves to convert the components of the SPL to useful end products. Moreover, there are no significant amounts of solid waste material from the process of the present invention which must be subsequently disposed of in landfills or stored, as previously required in other processes and practices for treating spent potliner material. In addition, the process of the present invention efficiently recycles water, heat and produces refractory material which can be used in the fabrication of new aluminum reduction cells, thereby providing a highly efficient and economic process without a liquid or noxious gas waste stream. The primary end products of aluminum fluoride, refractory material and sodium sulfate are all usable, either in the actual manufacture of aluminum reduction cells, or in other commercial endeavors. The stored impurities of calcium hydroxide, iron hydroxide, magnesium hydroxide, ammonium sulfate and calcium chloride are all benign, and are all treatable in accordance with conventional processes and may be reclaimed for a wide variety of commercial uses since they include no environmentally hazardous materials, such as for water treatment to recover fluoride and solids. As a result, it is seen that the present invention is a highly efficient process and very economical in both its operation as well as its yield, and that it avoids having to deposit fused solid material containing environmentally hazardous component into landfills or storage.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention. It should be further understood and that the scope of the present invention is to be limited only to the claims except as precluded by the prior art. Moreover, the invention as disclosed herein, may be suitably practiced in the absence of the specific elements or steps which are disclosed herein.

What is claimed is:

1. A method of treating spent potliner material from aluminum reduction cells, which spent potliner material may include fluoride compositions, cyanide compositions, iron compositions, calcium compositions, magnesium compositions, alumina, carbon, silica and sodium sulfate, said method comprising the steps of:

introducing said spent potliner material into a sulfuric acid digester to produce a gas component which may include hydrogen fluoride and hydrogen cyanide, and a slurry component including carbon, silica, alumina, sodium sulfate, iron sulfate, calcium sulfate and magnesium sulfate;

recovering said gas component from said digester and heating it to a temperature which is sufficient to decompose any hydrogen cyanide which has been produced, and thereby produce a gas component which is substantially cyanide free, and including $CO_2$, $H_2O$, nitrogen oxides and HF;

combining said gas component with water to form hydrofluoric acid;

admixing said hydrofluoric acid with aluminum hydroxide to create aluminum fluoride;

rinsing said slurry component with water to separate a first solid fraction including carbon, alumina and silica from a second liquid fraction;

adjusting said second liquid fraction to a first pH in the range of about 12.0–12.5 to create sodium aluminate in solution while precipitating impurities including Ca, Fe and Mg and then filtering the impurities from the liquid to produce a filtered liquid fraction;

adjusting the filtered liquid fraction to a second pH in the range of about 7.0–8.0 to precipitate and form aluminum hydroxide from the filtered liquid fraction;

admixing said first solid fraction with an alumina/silica mix to form an admixture; and subjecting said admixture to an elevated temperature in an oxygen-rich atmosphere to oxidize said carbon and vitrify said alumina and silica into refractory material.

2. The method as claimed in claim 1, wherein said spent potliner material is pulverized prior to introducing it into said digester.

3. The method as claimed in claim 2, wherein iron is removed from said pulverized potliner material by exposing said material to magnetic separator means prior to introducing said pulverized potliner material into said digester.

4. The method as claimed in claim 2, wherein said spent potliner material is pulverized to particulate material having a size less than 16 mesh.

5. The method as claimed in claim 1, wherein said sulfuric acid digester comprises an adjustable speed screw auger.

6. The method as claimed in claim 5, wherein said auger is maintained at a temperature in the range of 135°–160° C. under a negative atmospheric pressure to remove gas generated therein, and said auger is adjusted to rotate at a speed which allows at least 30 minutes retention time of said spent potliner material therein.

7. The method as claimed in claim 1, wherein the sulfuric acid within said digester is concentrated at a ratio of approximately 0.8:1 by weight of sulfuric acid to spent potliner material.

8. The method as claimed in claim 7, wherein said gas component is heated to approximately 800° C. to effectively eliminate hydrogen cyanide.

9. The method as claimed in claim 1, wherein said slurry component is rinsed with water at a water scrubber, and said water scrubber produces hydrochloric acid and a gas, said gas being passed to a caustic scrubber prior to release of said gas to the atmosphere.

10. The method as claimed in claim 9, wherein said caustic scrubber utilizes sodium hydroxide.

11. The method as claimed in claim 9, wherein said hydrofluoric acid is admixed with said aluminum hydroxide in an aluminum hydroxide reactor, and wherein water is purged from said reactor and directed back to said water scrubber to recover any residual fluorides.

12. The method as claimed in claim 1, wherein the step of rinsing said slurry component comprises a first stage rinsing with water to remove water soluble salts from said slurry, and a second stage rinsing step to polish the solids in said slurry.

13. The method as claimed in claim 12, wherein the step of rinsing said slurry component further comprises a third stage rinsing of said slurry component with an ammonium chloride rinse to react calcium sulfate impurities to form a liquid substrate having soluble ammonium sulfate and calcium chloride.

14. The method as claimed in claim 13, wherein the first pH adjustment of said liquid fraction is in the range of about 12.0 to about 12.5, whereby sodium aluminate is precipitated to produce a second solid substrate having insoluble iron hydroxide, calcium hydroxide and magnesium hydroxide therein, said second solid substrate being admixed with the liquid substrate of said third stage rinse for subsequent treatment and recovery of dissolved components thereof.

15. The method as claimed in claim 1, wherein prior to said first pH adjustment of said liquid fraction to the range of about 12.0–12.5, said liquid fraction is admixed with an alcohol to separate residual sulfuric acid from said liquid fraction.

16. The method as claimed in claim 15, wherein the pH of said liquid fraction is adjusted a second time to a range of about 7.0–8.0 to precipitate and separate aluminum hydroxide, the remaining liquid being admixed with alcohol to precipitate and form sodium sulfate.

17. The method as claimed in claim 16, wherein said sodium sulfate is then processed into a solid byproduct.

18. The method as claimed in claim 1, wherein said processes produces primary end products of aluminum fluoride, refractory material for furnace brick and sodium sulfate, and further produces secondary byproducts of calcium chloride and ammonium sulfate with trace impurities of iron and magnesium.

19. A process for recovering fluoride, aluminum, sodium and brick material from spent aluminum potliner (SPL) material said SPL material further including cyanide, carbon, silica, calcium, iron and magnesium, said process comprising the steps of:

crushing said SPL material into a particulate feed;
introducing said particulate feed into a heated sulfuric acid digester to produce a gas component including hydrogen fluoride and hydrogen cyanide, and a slurry component comprising a residual solid fraction and a liquid fraction, said liquid fraction having an acid pH and said solid fraction including carbon, silica, alumina, sodium sulfate, calcium, iron and magnesium;

recovering said gas component from said digester and heating it to a temperature effective to convert said hydrogen cyanide and hydrogen fluoride to a residual gas component including carbon dioxide, steam, nitrogen oxides and hydrogen fluoride;

directing said residual gas component through a water scrubber to form hydrofluoric acid and then reacting said hydrofluoric acid with aluminum hydroxide to form a first end product of aluminum fluoride;

rinsing said slurry component with a water rinse to first remove salts therefrom and then polish the solids in said solid fraction to form the liquid fraction containing said salts and the solid fraction containing said carbon, alumina and silica;

adjusting the pH of said slurry component liquid fraction to a first pH in the range of about 12.0–12.5 to create and separate an intermediary product of sodium aluminate in solution while precipitating calcium hydroxide, iron hydroxide and magnesium hydroxide as impurities;

adjusting the pH of said intermediary product solution to a second pH in the range of about 7.0–8.0 to precipitate aluminum hydroxide for use in reacting with said hydrofluoric acid to form said first end product, while forming a resultant liquid stream containing soluble sodium sulfate;

mixing said resultant liquid stream with alcohol to precipitate a second product of sodium sulfate;

rinsing said slurry component solid fraction with an ammonium chloride solution to react with calcium sulfate therein to form an intermediary solution containing soluble ammonium sulfate and calcium chloride, and then admixing said intermediary solution with said residual solid fraction; and admixing said slurry component solid fraction with an alumina/silica mix to obtain a 70/30 alumina/silica ratio, by weight, drying said 70/30 mix, and then subjecting said 70/30 mix to temperatures of greater than about 1500° C. in an oxygen-rich environment to produce carbon dioxide and heat as by-products and create a third end product comprising refractory material.

20. The process as claimed in claim 19, wherein said oxygen in said oxygen-rich environment is air.

21. The process as claimed in claim 19, wherein said slurry component rinsing step includes a first rinsing stage with water to remove said salts and then a separate second rinsing stage with water to polish said solids.

22. The process as claimed in claim 19, wherein said SPL particulate feed is passed through a magnetic separator prior to introducing it into said digester to remove iron therefrom.

23. The process as claimed in claim 19, wherein said sulfuric acid digester comprises a screw auger operated under negative pressure to assist in removing said gas component therefrom.

24. The process as claimed in claim 23, wherein said screw auger is heated to a temperature in the range of about 135° to 160° C., and wherein said crushed particulate feed is maintained within said screw auger for approximately at least 30 minutes residence time.

25. The process as claimed in claim 19, wherein said effective heating treatment of said gas component comprises greater than approximately 800° C.

26. The process as claimed in claim 19, wherein said residual gas component is directed through said water scrubber to produce a liquid portion containing said hydrofluoric acid and a gas portion, said liquid portion being directed to an aluminum hydroxide reactor to react said hydrofluoric acid with said aluminum hydroxide to form aluminum fluoride which is subsequently dried.

27. The process as claimed in claim 26, wherein said gas portion from said water scrubber is passed through a caustic scrubber utilizing sodium hydroxide at a pH in the range of about 7.0–8.0 to polish the gas prior to releasing it to the atmosphere.

28. A process for recycling spent potliner (SPL) material from aluminum reduction cells into refractory material for reforming furnace brick, aluminum fluoride for reuse in an aluminum reduction cell, sodium sulfate for use in commercial applications, atmospheric gases and ammonium sulfate, said process comprising the steps of:

crushing said SPL material into a particulate feed;

introducing said particulate feed into a screw auger digester containing concentrated sulfuric acid heated to a temperature in the range of about 135° to about 160° C. to produce a gas component including hydrogen fluoride and hydrogen cyanide, and a slurry component comprising solid and liquid fractions, said liquid fraction having an acid pH, and said solid fraction including carbon, silica, alumina, sodium sulfate, calcium, iron and magnesium;

recovering said gas component from said digester and heating it to greater than about 800° C. to convert said hydrogen cyanide and hydrogen fluoride to a residual gas component including carbon dioxide, steam, nitrogen oxides and hydrogen fluoride;

directing said residual gas component through a water scrubber to form a liquid portion containing hydrofluoric acid and a gaseous portion, and then reacting said hydrofluoric acid in an aluminum hydroxide reactor to form a first end product of aluminum fluoride, said gas portion being directed to a caustic scrubber utilizing sodium hydroxide to adjust the pH to the range of about 7.0–8.0 prior to releasing it to the atmosphere;

rinsing said slurry component with a first water rinse to remove soluble salts therefrom and then a second water rinse to polish the solids in said slurry to form a liquid fraction containing said soluble salts and a solid fraction containing carbon, alumina and silica;

mixing said liquid fraction with alcohol to remove excess sulfuric acid and precipitate water soluble salts;

redissolving said salts with water to reform a liquid fraction;

adjusting the pH of said reformed liquid fraction to a pH in the range of about 12.0–12.5 to create and separate an intermediary product of sodium aluminate in solution while precipitating calcium hydroxide, iron hydroxide, and magnesium hydroxide impurities;

adjusting the pH of said intermediary product solution to a second pH of about 7.0–8.0 to precipitate a second end product while forming a resultant liquid stream containing soluble sodium sulfate;

mixing said resultant liquid stream with alcohol to precipitate a second end product of sodium sulfate;

rinsing said solid fraction with an ammonium chloride solution to react with calcium sulfate to form an intermediary solution containing soluble aluminum sulfate and calcium chloride, and then admixing said intermediary solution with said solid fraction to form a solution from which ammonium sulfate is removed; and admixing said solid fraction with an alumina/silica mix to obtain an approximately 70/30 alumina/silica ratio, drying said alumina/silica mix, and then subjecting said mix to temperatures of greater than approximately 1500° C. in an oxygen-rich environment to create a third end product comprising refractory material and produce carbon dioxide and heat as by-products utilized to heat said gas component from said digester.

29. The process as claimed in claim 28, wherein said calcium hydroxide, iron hydroxide and magnesium hydroxide impurities are admixed with hydrogen chloride to create a fourth end product of calcium chloride, iron chloride and magnesium chloride useful in water treatment.

30. A method of processing of a liquid sodium sulfate solution into dry, solid sodium sulfate comprising the steps of;

admixing the sodium sulfate solution with an alcohol to precipitate said sodium sulfate;

filtering said sodium sulfate precipitate from said alcohol solution mixture; and drying said precipitated sodium sulfate.

31. The method of claim 30, wherein said alcohol is selected from the group consisting of methanol and ethanol.

* * * * *